(12) United States Patent
Mieslinger et al.

(10) Patent No.: US 8,269,688 B2
(45) Date of Patent: Sep. 18, 2012

(54) APPARATUS, METHOD AND USE FOR SCREENING THE MAGNETIC FIELD OF AN RFID TRANSPONDER

(75) Inventors: Stefan Mieslinger, Essenbach (DE); Michael Kober, Bruckmühl (DE)

(73) Assignee: Identive Systems GmbH, Sauerlach (DE)

( * ) Notice: Subject to any disclaimer, the term of this patent is extended or adjusted under 35 U.S.C. 154(b) by 436 days.

(21) Appl. No.: 12/669,149

(22) PCT Filed: Jul. 17, 2008

(86) PCT No.: PCT/EP2008/005869
§ 371 (c)(1),
(2), (4) Date: Jan. 14, 2010

(87) PCT Pub. No.: WO2009/010294
PCT Pub. Date: Jan. 22, 2009

(65) Prior Publication Data
US 2010/0201596 A1 Aug. 12, 2010

(30) Foreign Application Priority Data

Jul. 17, 2007 (DE) .......................... 10 2007 033 280
Aug. 7, 2007 (DE) .......................... 10 2007 037 293

(51) Int. Cl.
*H01Q 1/52* (2006.01)
(52) U.S. Cl. ........................................ 343/841
(58) Field of Classification Search .................. 343/841, 343/702, 842, 872, 873, 572.7
See application file for complete search history.

(56) References Cited

U.S. PATENT DOCUMENTS

| 6,018,298 | A  | * | 1/2000 | Endo et al. ................. | 340/572.5 |
| 6,622,921 | B2 | * | 9/2003 | Altwasser et al. ............ | 235/492 |
| 6,727,862 | B2 | * | 4/2004 | Tomon .......................... | 343/895 |
| 7,699,231 | B2 | * | 4/2010 | Yamaguchi ................... | 235/492 |
| 7,870,665 | B2 | * | 1/2011 | Nomura et al. ................ | 29/847 |

(Continued)

FOREIGN PATENT DOCUMENTS

DE 197 33 849 6/1998

(Continued)

*Primary Examiner* — Huedung Mancuso
(74) *Attorney, Agent, or Firm* — Hamre, Schumann, Mueller & Larson, P.C.

(57) ABSTRACT

An apparatus for screening the magnetic field of a transponder is described, which apparatus comprises, in a first area section, at least one flat antenna structure which comprises conductor tracks for conducting current in a direction of current flow and has an application-specific extent, wherein the apparatus comprises a second area section or carrier to which strips of a highly permeable screening material are applied such that they are oriented with respect to one another in a predetermined manner, wherein the second area section is arranged parallel to the first area section. In order to effectively screen the magnetic field which is beamed in from the outside, for instance by a reader, and in order to effectively screen the magnetic field which is generated by the antenna structure of the transponder itself following excitation, and in order to reduce eddy current losses in a metal area arranged underneath, the highly permeable screening material has either anisotropic permeability, wherein increased permeability is provided in the direction of current flow, in particular in the direction of the conductor tracks of important sections of the antenna structure, or else provides for the strips to be oriented parallel to one another in important sections, wherein the longitudinal edges of the strips are provided in the direction of current flow, in particular in the direction of the conductor tracks of important sections of the antenna structure.

59 Claims, 9 Drawing Sheets

U.S. PATENT DOCUMENTS

2006/0255945 A1    11/2006  Egbert

FOREIGN PATENT DOCUMENTS

| | | |
|---|---|---|
| DE | 100 17 142 | 10/2001 |
| DE | 101 49 126 | 4/2003 |
| DE | 10 2005 045 911 | 4/2007 |
| EP | 1 594 082 | 7/2004 |

* cited by examiner

APPARATUS, METHOD AND USE FOR SCREENING THE MAGNETIC FIELD OF AN RFID TRANSPONDER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to an apparatus for screening the magnetic field of an RFID transponder, in addition to a method for the manufacture of a screen for the magnetic field of an RFID transponder, and the use of an apparatus for screening the magnetic field of an RFID transponder in accordance with the preambles of claims 1, 2, 17, 18 and 32.

BACKGROUND OF THE INVENTION

The use of transponders, in particular of RFID transponders (radio frequency identification transponders), has already become widely accepted in countless areas of life and work. Due to the property of RFID transponders, in the following also referred to simply as transponders, of recording, processing and rereleasing information contactlessly via electromagnetic fields, they can contribute in a particularly advantageous manner to reducing what are referred to as media disruptions, that is to say gaps between the real physical world and the digital world of information processing. In particular, their use focuses on automatic identification methods that contribute towards improving business management or technical processes, safety-related procedures and also general identification processes. Typically, such transponders are used for real-time identification in supply chains and in logistics processes of commercial enterprises, the pharmaceutical industry, the automotive industry and other manufacturing companies and they support the control and progress of specific production and logistics operations. Transponders are typically attached to packages, pallets and containers so that they are easily accessible and can quickly be activated.

RFID technology is typically based on the fact that serial numbers of codes are stored on a microchip integrated in a transponder whereby the microchip may be used both as an electronic data memory and also, for example, for signal processing. The serial number or codes may be read, for example, via wireless communication by means of magnetic fields. First of all a transponder antenna is activated by resonance by means of an external magnetic field. The transponder converts the signal received in a predetermined manner and then re-emits a magnetic field, or modifies the signal beamed in such a way that external resonators in a reader can detect this field and as a result allow information to be read. In this case the coupling of reader and transponder takes place in a manner comparable to the principle of the loosely coupled transformer. In this case data transmission by means of a magnetic field typically takes place in the HF range. In addition, state of the art RFID technology also allows a plurality of RFID transponders to be read simultaneously and completely automatically without there having to be a direct line of sight between a reader and the RFID transponder. Similarly, the RFID technology permits use in adverse environments by embedding transponders, for example, in objects and these thus not being directly affected by immediate environmental impacts. Compared to barcode scanners, for example, reading over a larger distance is also possible whereby in addition information may also be stored and modified on an RFID transponder thus enabling a very flexible and dynamic identification process.

If, however, such RFID transponders are used as a substrate on metallically conductive surfaces, the functionality of these devices is sometimes reduced dramatically since, because of the magnetic fields used for communication between transponder and reader, eddy currents may be induced in the metallic material and also sometimes in the antenna structure, and as a result electric excitation of the transponder antenna cannot be carried out with sufficient energy. By beaming in a magnetic alternating field, electrical eddy currents are induced in the metal surfaces such that according to Lenz's rule they for their part induce an alternating magnetic field which counteracts the magnetic field beamed in. Consequently, the resulting magnetic field on the metallic surface is weakened to such an extent that adequate energy supply of the transponder and data transfer become impossible. In addition, due to the metallic surface, in the event of direct contact with the electrically conductive transponder, or even by simply approaching it, there is a clear de-tuning of the transponder's resonant frequency, as a result of which it either becomes necessary to retune the reader to the altered frequency or other precautions must be taken in order to enable communication between reader and transponder at customary permanently pre-set resonant frequencies.

In order to find a remedy for such problems, mechanical spacers among other things are used in conjunction with transponders on a metallic surface, which attach the transponders in a position elevated above the metallic material. Although this ensures the transponder's functional capability, the construction may sometimes represent a significant limitation due to the resulting overall height of transponder and spacer. Gaps of a few centimeters are not unusual for such spacers. Moreover, the production costs for such spacers may also be far above the costs for the actual transponder and thus make this technology appear unattractive for many processes where high quantities are used.

Beyond this, thin plastic-bonded ferrite films are also used for magnetic field screening. The manufacture of such a ferrite film, however, places high demands on the homogeneity of the composite material and therefore results in relatively high costs for manufacture. After lamination of this typically viscoplastic, brittle material made of ferrite and plastic, a stiff and barely flexible tag is created with an overall height of typically at least one millimeter. The device can only be attached to flat surfaces due to the stiffness. High manufacturing costs and the thickness of the entire device additionally restrict the application range of this magnetic field screening.

DE 100 17 142 A1 describes a self-adhesive data exchange tag which provides for a transmitter and receiver device as well as a transponder antenna, whereby an erectable section is also provided, using which the antenna can be brought into a position perpendicular to a metallic surface. Although the data exchange on metallic surfaces is improved with this positioning of the antenna, nevertheless the disadvantage which arises is again a large average distance between the antenna and the metallic surface and low mechanical stability of the data exchange tag.

EP 1 594 082 A1 describes a configuration and a method for attaching a transponder element to an object such as a metallic surface, whereby a tag furnished with expansion or shrink film is provided, said tag being attached between the surface or substrate and the transponder. Subsequently, the expansion or shrink film is activated by supplying heat or UV light, whereby the gap between transponder and surface can be adjusted advantageously such that, for example, the result is a reduction of eddy currents on a metallic surface and improved reading of the transponder. The device described is again characterised, however, by a relatively large overall height, and similarly requires that there are no mechanical forces acting on the tag. In addition, due to activation by means of heat or UV light there may be adverse effects on and damage to the object on which the tag has been attached.

DE 101 49 126 A1 describes a device for screening a transponder and a method for manufacturing corresponding screening. Screening is facilitated by using small particles, preferably 300 μm×50 μm×10 μm in size, which are embedded in a liquid matrix and aligned in a constant magnetic field. The alignment is carried out in such a manner that the particles run parallel to a magnetic field induced by the transponder. The screening is preferably applied to a surface using printing technology, whereby curing of the printing structures takes place subsequently. The overall process is complex and results in a brittle screen with limited flexibility. Due to the printing process, the application is normally reduced to flat surfaces or makes it necessary to use a relatively complicated printing method. The constantly parallel alignment of the particles to the induced magnetic field lines of the transponder requires expensive magnetisation units to generate complex magnetic fields in the case of complex antenna geometries. Moreover, high-precision alignment during the lamination process is required for bonding of the transponder and screen in order to achieve parallelism between the magnetically induced transponder field and the aligned particles, which makes mass production considerably more difficult and consequently leads to higher costs for an end product.

BRIEF SUMMARY OF THE INVENTION

The object of the present invention is to develop an apparatus according to DE 101 49 126 A1 and to describe an even more efficient magnetic field screen made from easily obtainable materials, which moreover also has a structure which permits easier alignment of the magnetic field screen and antenna structure. In addition to this, the intention is to illustrate a method for the production of such a magnetic field screen and a use of such an apparatus.

This object is achieved by means of an apparatus, a method and a use according to claims 1, 2, 17, 18 and 32.

In particular, the object is achieved by means of an apparatus for screening the magnetic field of an RFID transponder in relation to a substrate, which apparatus comprises, in a first area section, at least one flat antenna structure which comprises conductor tracks for conducting current in a direction of current flow and has an application-specific extent, wherein the apparatus comprises a second area section or carrier to which strips of a highly permeable screening material are applied such that they are oriented in a predetermined manner with respect to one another, wherein the second area section is arranged parallel to the first area section, whereby the highly permeable screening material has an anisotropic permeability, and whereby an increased permeability is provided in the direction of current flow of important sections of the antenna structure.

In addition, the object is achieved by means of an apparatus for magnetic field screening of an RFID transponder, which transponder comprises, in a first area section, at least one flat antenna structure which comprises conductor tracks for conducting current in a direction of current flow and has an application-specific extent, wherein the apparatus comprises a second area section or carrier on which strips of a highly permeable screening material are applied such that they are oriented with respect to one another in a predetermined manner, wherein the second area section is arranged parallel to the first area section, whereby the strips are aligned in substantial sections parallel with one another and are spaced apart by means of clear areas between longitudinal edges of the strips, whereby the longitudinal edges of the strips are provided in the direction of current flow, in particular in the direction of the conductor tracks of substantial sections of the antenna structure.

Moreover, the object is achieved by means of a method for the manufacture of magnetic field screening for an RFID transponder, which screen comprises, in a first area section, at least one flat antenna structure which comprises conductor tracks for conducting current in a direction of current flow and has an application-specific extent, whereby the method comprises the provision of a second area section or carrier to which strips of a highly permeable screening material are applied such that they are oriented in a predetermined manner with respect to one another, wherein the second area section is arranged parallel to the first area section, whereby the highly permeable screening material is manufactured with an anisotropic permeability, whereby the screening material is aligned relative to the antenna structure such that an increased permeability results in the direction of current flow, particularly in the direction of the conductor tracks of substantial sections of the antenna structure.

In addition, the object is achieved by means of a method for the manufacture of magnetic field screening for an RFID transponder, which transponder comprises, in a first area section, at least one flat antenna structure which comprises conductor tracks for conducting current in a direction of current flow and has an application-specific extent, whereby the method comprises the provision of a second area section or carrier on which strips of a highly permeable screening material are applied such that they are oriented in a predetermined manner with respect to one another, wherein the second area section is arranged parallel with the first area section, whereby the strips are aligned in substantial sections parallel with one another and are spaced apart by means of clear areas between longitudinal edges of the strips, whereby the longitudinal edges of the strips are provided in the direction of current flow, in particular in the direction of the conductor tracks of important sections of the antenna structure.

Moreover, the object is achieved by a use of an apparatus for screening the magnetic field of an RFID transponder, according to one of claims 1 to 13, for reducing functional losses of the RFID transponder caused by eddy current losses.

A substantial point of the invention is that the magnetic field screen comprises a highly permeable screening material in strips which have anisotropic permeability wherein increased permeability is provided in the direction of current flow of important sections of the antenna structure. The strip shape of the screening material is responsible not only for suppressing eddy currents and the magnetic fields induced as a result, which are generated by introducing the transponder into the magnetic field of a reader in the electrically conductive surface of a metallic surface, for example, but also for suppressing eddy currents which are induced by the magnetic field of the reader in the strips themselves. A further substantial point is that the strips of the highly permeable screening material are aligned parallel to one another in important sections and the longitudinal edges of the strips are aligned in the direction of current flow, in particular in the direction of the conductor tracks of important sections of the antenna structure. Beamed in magnetic fields are hereby deflected very advantageously due to the parallel structure of the strips, thus also contributing to a reduction of the eddy currents, but also being able in addition, due to their geometric shape and configuration, to influence the magnetic reversal losses by beaming in an alternating magnetic field.

Here, as in all other parts, parallelism should be understood as a purely local, point-by-point parallelism. Consequently, it is also possible to speak of parallelism if the strips do not have any straight lateral edges. In the sense used here, parallelism may also occur, for example, between wavy lines or circular segments, if the spacing between the lateral edges of two adjacent strips is a constant distance that is the tangents on the lateral edge lines of two strips have the same gradient at each point at which they are closest to one another.

A magnetic field screen is described which is provided to deflect or attenuate the primary and any possible secondary magnetic fields by means of a highly permeable material such that the attenuation of the magnetic field on the surface of a metallically conductive material is reduced or even eliminated. The orientation of the anisotropy of the screening material's permeability or the alignment of the strips of screening material is effected in this case such that the magnetic primary field is deflected in such a manner that the electrical fields induced by the deflected primary magnetic field are perpendicular to important sections of the antenna structure and consequently cannot impair the current flow in the antenna structure, said flow taking place in a direction perpendicular thereto. Equally, the secondary magnetic field is partially deflected in such a manner that there can be no significant attenuation of the primary magnetic field beamed in.

In a first embodiment of the invention, the strips are aligned substantially parallel to one another and spaced apart by means of clear areas between longitudinal edges of the strips. Alignment of the strips in such a manner makes it possible to create relatively clear geometric structures which allows easier alignment of an adapted antenna structure. In addition, the clear areas make it possible to save on highly permeable screening material compared to a full area embodiment but nevertheless to achieve a good screening effect. These material savings are extremely important from an economic point of view, above all when manufacturing large quantities. Far more significant, however, is that the strips themselves contribute to the suppression of electrical eddy currents from electrically conductive screening materials for example.

Equally, the strips may have a further bundling effect with regard to the magnetic field, for example when the magnetic field of a reader that is beamed in does not hit the surface of the strips vertically but at an angle. Above all, this effect also has an effect on the magnetic reversal losses which are brought about when an alternating magnetic field is beamed into the screening material.

Another advantageous embodiment of the apparatus for screening of a magnetic field is characterised in that the screening material has an electrical conductivity that is lower than that of a substrate onto which the magnetic field screen may be applied. Consequently, eddy currents can only occur to a limited extent in the screening material compared to the substrate, a metal surface for example, and a corresponding opposing field can be generated. The electrical conductivity of the screening material may equally be very low with the result that the eddy currents can be suppressed still further.

A further advantageous embodiment of the apparatus for screening of a magnetic field is characterised in that the screening material has an electrical conductivity that is lower than the conductivity of the material of the antenna structure. The effect of this is that the eddy current losses in the screening material itself are kept low and do not lead to any major losses or to attenuation of the magnetic fields. In addition, possible detunings of the resonant frequency of the transponder's antenna structure are also reduced, which may arise because the strips act as an additional capacitance of the transponder's antenna structure and bring about a change in the resonant frequency. Such frequency detunings are normally eliminated either by additional electronic components which are connected to the transponder or by the insertion of a further external capacitance that is not connected, for example, in the carrier on which the strip and transponder are disposed together. Such corrections must typically be carried out anyway to a small extent in order to eliminate a detuning of the transponder's resonant frequency by the strips. Although the screening material of the strips may be electrically conductive, this feature does not exclude the fact that its conductivity is lower than the conductivity of the material of the antenna structure.

A preferred embodiment of the apparatus for screening of a magnetic field may further be characterised in that the screening material has a specific resistance of at least $10^{-8}$ $\Omega$m and of at most $10^{-2}$ $\Omega$m. The specific resistance is suitable in most cases to classify a material as a conductor ($<10^{-6}$ $\Omega$m), semiconductor (from $10^{-6}$ $\Omega$m to $10^{10}$ $\Omega$m) or isolator ($>10^{10}$ $\Omega$m). However, in this case the division has no absolute limits and should predominantly be considered as a practical criterion for division. The main reason for this is the temperature dependency of the electrical resistance, particularly in semiconductors. According to the typical values of the specific resistances for different materials, here the screening material extends over a range of values which is characteristic for both conductors and also semiconductors. In any case, however, it is possible to guarantee a basic electrical conductivity of the screening material. Thus the screening material differs from very poorly or non-conducting screening materials, such as ferrites, which although they may also have a high permeability do not have the conductivity of the present screening material.

Moreover, it is possible that the screening material comprises iron, nickel, cobalt, gadolinium, compounds of the garnet group of substances, such as yttrium-aluminium compounds, alloys of said substances or samarium or amorphous metals. Also conceivable, however, are other ferromagnetic metals, substances and compounds as a screening material with similarly highly permeable properties. These substances and compounds, or mixtures thereof, which are characterised by a high absolute magnetic permeability, may be advantageously used to guarantee an increased permeability of the screening material for magnetisation screening. As the substances or compounds referred to here are widely-used industrial materials, they enable cost-effective manufacture of the strips of screening material. Accordingly, the screening material may be obtained from materials produced industrially on a large scale, for the production of which it is possible to use simple, easy to control processes.

In a preferred embodiment, the screening material may comprise a soft magnetic metal with low magnetic reversal losses, in particular a μ metal. μ metals are metallic materials which are characterised by both high permeability and also by their soft magnetic properties. Such a soft magnetic material offers the advantage that the energy losses on magnetic reversal in an alternating magnetic field are significantly reduced compared to a normal metal or a hard magnetic metal. Magnetisation losses normally occur due to the work which a magnetic field must do in order to reverse the magnetisation of the remanence in a magnetised material, that is to say the magnetic reversal losses. By reducing the magnetisation losses in the screening material of the strips, for example, it is possible that magnetic fields of lower intensity can be used for communication between transponder and reader, or that with the same intensity the range for effective communication between transponder and reader can be increased.

In a further preferred embodiment, the screening material comprises nanocrystalline structures. Nanocrystalline structures may sometimes by characterised by very high absolute permeability whereby the permeability figures are in part significantly above 100,000. In addition, crystalline structures have a geometrically preferred orientation which can make it easier to identify and align the permeability.

In an advantageous embodiment, the strips are formed flexibly and have a thickness of less than 500 μm, preferably less than 100 μm, in particular less than 50 μm. A flexible design of the strips also assists the application of the strips on surfaces that are not flat but have a curvature for example. It is also possible to reduce mechanical damage to the strips or, due to their flexibility, to increase their mechanical load bearing capacity if, for example, there are unforeseen applications of force on the screening material. Due to the intended thickness of the strips, it is ensured that the transponder is not disposed in a significantly raised position above the surface on which the transponder is attached together with the magnetic field screen. This may prove above all to be advantageous if there is restricted space available for the devices for screening of a magnetic field.

An alternative embodiment may further be characterised in that the strips are disposed one above the other in a plurality of layers separated by insulating layers. It is possible by this means to actually increase the magnetic field screening more and to guarantee even more effective magnetic field screening due to a cumulative screening effect of a plurality of layers. Consequently, data transmission may be carried out more effectively or over a greater range.

Furthermore, the carrier may consist of a material that is essentially non-conductive. Thus the carrier has electrically insulating properties which may be advantageous above all if the carrier, for example, is in contact with the electrically conductive antenna structure in order to suppress or minimise short-circuits or detuning of the antenna structure's resonant frequency.

Furthermore, the carrier and/or the insulation layers may also have a material which essentially has a relatively low permittivity $\in_r$. Low relative permittivity is considered here to be values of $\in_r=1$ to 100, in particular of $\in_r=1$ to 5 and further in particular of $\in_r=1$ to 2. The relative permittivity $\in_r$ characterises the field weakening effects of dielectric polarisation within electrically insulating materials. If, for example, an electrical field is introduced to a capacitor filled with an insulating material, the charge carriers of the insulating material orientate themselves according to the electrical field and form a polarisation field which counteracts the external field and weakens it. If, as in the present case, this weakening is slight, it is possible to reduce a capacitive interaction between the antenna and the strips of screening material and/or between the strips of screening material and the substrate onto which the magnetic field screen is applied.

It is further possible for the carrier to be formed as an inlay of a transponder. This enables the transponder to be kept safe and protected and also enables fast and unambiguous connection of the transponder to the inlay without complications.

In a preferred embodiment, the carrier with the transponder attached on it is enclosed in plastic, paper or film laminate whereby preferably at least one insulation layer is provided between the carrier and the transponder. Enclosure in plastic, paper or film laminate enables the manufacture of complete transponder/magnetic field screening units which on one hand are well-protected against external impacts, but which may also, however, be produced by means of appropriate shaping such that they are adapted to any spatial requirements.

The device for magnetic field screening may also be characterised yet further in that an area section, which is captured by the strips on the second area section, is at least as big as the first area section and overlaps the same. Such a device guarantees the most complete screening possible of the antenna structure and consequently achieves the best possible two-dimensional magnetic field screen.

In a further advantageous embodiment, the apparatus may be formed in such a manner that the transponder works in the high frequency range, in particular at 13.56 MHz. Compared to the similarly manufactured transponders that work in the low frequency range at 135 kHz, such a transponder has the huge advantage that the antenna structure requires considerably fewer antenna windings for inductive coupling with the reader, that is to say it results in significant space savings. On the other hand, in the case of transponders that work in the UHF ranges of 868 MHz, 915 MHz and 2.45 GHz and 5.8 GHz, the coupling between reader and transponder does not take place by way of magnetic but by way of electromagnetic coupling. Such UHF transponders, however, cannot be used universally as their permitted working frequencies vary widely from region to region. Products that, for example, might be identified without a problem via an 868 MHz transponder in one country may possibly not be capable of being identified in another country at 868 MHz as the permitted frequency ranges of the electromagnetic radiation used do not match the resonant frequency of the transponder's antenna structure. However, if the transponder being used is an HF transponder, then it may be read universally and regardless of its physical location as only energy in the form of magnetic waves is necessary to read it and the frequency range described is internationally permitted and standardised.

The method for the manufacture of a magnetic field screen may be characterised in a preferred embodiment, in that the strips are aligned substantially parallel to one another and spaced apart by means of clear areas between longitudinal edges of the strips. Alignment of the strips in such a manner makes it possible to create relatively clear geometric structures that allow easier alignment of the antenna structure.

Another advantageous embodiment of the method for the manufacture of a magnetic field screen is characterised in that the screening material has an electrical conductivity that is lower than that of a substrate onto which the magnetic field screen may be applied. Consequently, eddy currents can only occur to a limited extent in the screening material, which is present, for example, in the form of parallel strips, compared to the substrate, a metal surface for example, and a corresponding opposing field can be generated. The electrical conductivity of the screening material may equally be very low with the result that the eddy currents can be suppressed still further.

Equally, the strips may have a further bundling effect with regard to the magnetic field, for example when the magnetic field of a reader that is beamed in does not hit the surface of the strips vertically but at an angle. Above all, this effect also has an effect on the magnetic reversal losses which are brought about when an alternating magnetic field is beamed into the screening material.

In an alternative way of executing the method, the strips are manufactured by etching a full-surface screening material. This again similarly guarantees that the strips can be manufactured industrially in large quantities in a short time using an easily controllable process. In addition, this method also permits adherence to very accurate specifications regarding dimensions and reproduction of very precise structures if, for example, a lithographic process is used in conjunction with it enabling excellent optical resolution.

The full-surface screening material may, in another preferred embodiment, be laminated onto the carrier in a roll-to-roll process. Roll-to-roll processes are established industrial processes which in turn permit the manufacture of large quantities of magnetic field screens. Organic films or paper, for example, are suitable as carrier substances. Production of the strips typically takes place in a next process step which, for example, uses lithographic or printing technology methods such as silk-screen printing, stencil printing, pad printing or transfer printing. In this case, it is possible in standard processes to produce any configurations of strips which may be disposed in any direction in relation to the full-surface screening material. In addition, a printing process also offers the advantage of short tooling times, that is to say greater flexibility for design changes with low tool costs and the existence of a broad infrastructure for roll-to-roll processing. Before producing the strips, the full-surface screening material is printed with a pattern which reproduces the configuration of the strips. If they are already bonded to the substrate, the carrier is provided with a protective lacquer. After curing of the protective lacquer, which may be initiated, for example, by heat convection, electromagnetic irradiation or moisture, the printed full-surface screening material runs through various etching and cleaning baths in which the actual production of the strips takes place. Here it would also be conceivable for the protective lacquer used to serve later as a lamination adhesive and/or electrical insulator.

Alternatively, the method may also provide for the strips to be laminated onto the carrier in a roll-to-roll process. Instead of producing the strips after application of the full-surface material to the carrier, it is also possible to produce the strips prior to their application. Again it is preferable when producing the strips to use lithographic or printing technology methods such as silk-screen printing, stencil printing, pad printing or transfer printing as described above. As the carrier in the method according to the embodiment does not have to be protected by a protective lacquer, for example, against the action of chemical substances that may be necessary for production of the strips, some manufacturing steps may be dropped from the present method and the entire process may be speeded up.

Alternatively, the method may also include manufacturing of the strips by means of a cutting, mechanical shaping process. In this case, for example, cutting or milling processes could be mentioned which permit the removal of material and can similarly produce strips in the quantities required industrially. In addition, virtually all materials can be processed by means of cutting methods.

As a further alternative, the strips are produced by means of a non-cutting, mechanical shaping process. To be considered here are rolling or die stamping methods, for example, which are primarily used for processing soft screening materials. It is possible by means of easily controllable industrial rolling methods to also produce without difficulty strips with thicknesses of up to just a few μm and even lower thicknesses. By this means it is possible to manufacture mechanically very thin layers of screening materials which consequently may be used to huge advantage in the production of magnetic field screens having extremely low thicknesses and at very low material costs.

Moreover, the strips may be produced by means of a wet chemical process. Wet chemical processes have the advantage that it is possible by using them to apply layers with extremely low thicknesses onto a carrier and it is also possible that no special bonding of carrier and strip will be necessary for a permanent bond. In addition, wet chemical processes permit the production of relatively complex strip structures even using simple means. Moreover, they may also be advantageously combined with further application steps for production of the strips. Thus it is conceivable, for example, to carry out a wet chemical process in a magnetic field so as to thus produce the strips in one process step and to bring about an anisotropy of the screening material's permeability.

As a further alternative, it is also conceivable for the strips to be produced by physical or chemical deposition of the screening material on the carrier. Such methods also enable direct bonding of carrier and strip as well as the production of strips, of very low thickness, for example from the gaseous phase. Since the deposition methods referred to—CVD (chemical vapour deposition) or PVD (physical vapour deposition)—are widely employed industrially and moreover guarantee a high level of conformity of the deposits, it is easy using these methods, for instance, to produce high quantities of strips cost-effectively.

In a preferred embodiment of the method, the anisotropy of the permeability of the highly permeable material is induced or reinforced by means of a magnetic field. This method also enables the use of mixtures of substances or particles with intrinsic anisotropy of the permeability for production of the strips, said substances or particles, for example, initially being present in suspension, which are aligned according to their magnetic permeability and are subsequently fixed in their position in the aligned position. In this case, for example, it is conceivable to use resins in which ferrite particles are suspended and which after alignment by means of a magnetic field are cured using heat or light of specific wavelength ranges. Production of the strips by means of printing technology methods would be conceivable.

In an alternative embodiment, the strips are fixed on the carrier by means of a bonding agent or a lacquer. Such fixing means are inexpensive and easily available, thus allowing a relatively cost-effective production process which is addition is still easy to control.

It is also further possible to bond the carrier to the transponder after the strips have been fixed on the carrier. This way of proceeding, for example, allows the magnetic field screening to be produced separately, that is to say partially independently of the transponder's antenna structures, and for it to be marketed as an independent product.

Alternatively, it is also possible to bond the carrier to the transponder before the strips are fixed on the carrier. It would then be possible, for example, to use this manner of production if the intention is to produce the unit made up of strips, carrier and transponder in one production process and to sell it as a whole.

It is further conceivable that bonding of the transponder and the apparatus for magnetic field screening will be performed by means of folding, laminating or an encapsulation process. These methods in turn permit the use of relatively simple standard processes such as are known, for example, for the production of cheque cards in order to produce a unit made up of transponder and magnetic field screen which is present in a protected format.

Further embodiments of the invention emerge from the subclaims.

BRIEF DESCRIPTION OF THE DRAWINGS

The invention will be described in the following based on embodiments which will be explained in greater detail on the basis of the drawing. The drawings show.

DETAILED DESCRIPTION OF THE INVENTION

Figure 1:
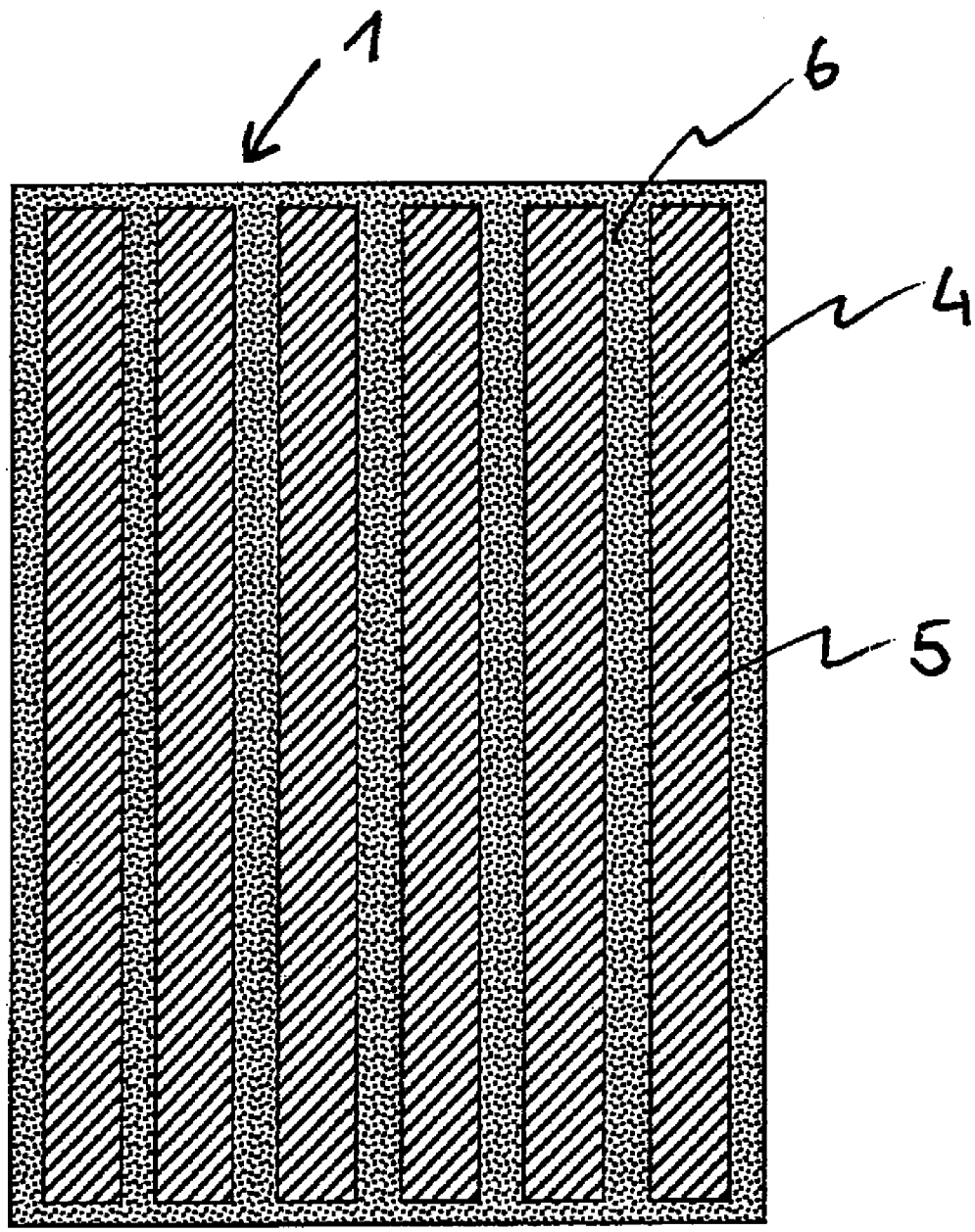
FIG. 1 a first embodiment of the invention in a view from above.

The same reference numerals are used in the following description for identical parts or parts acting in an identical manner.

FIG. 1 illustrates a rectangular magnetic field screen 1, the longitudinal extension of which is greater than its transverse extension. The rectangular shape is defined by carrier 4 on which strips 5 made from the magnetic field screening material are attached. Strips 5 have themselves a rectangular form in such a way that their two-dimensional longitudinal extension is significantly larger than their transverse extension. In total, six strips 5 are disposed parallel to one another. Between each of strips 5 are uniform clear areas 6. Strips 5 are further disposed in such a manner that they lie completely within the area section of carrier 4.

Further possible top layers above strips 5 or insulating layers between strips 5 and carrier 4 are not illustrated here.

Figure 2:
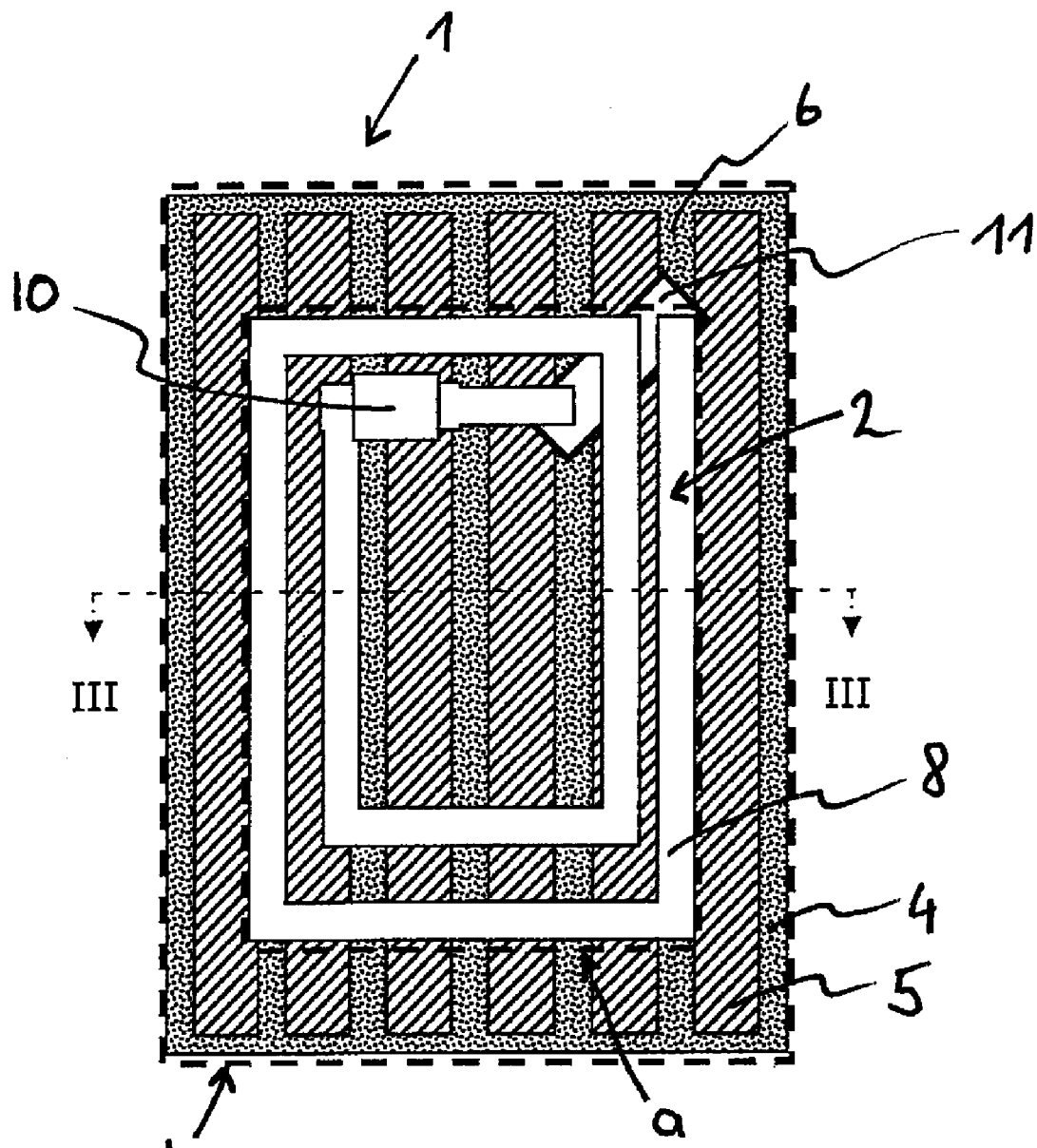
FIG. 2 the first embodiment of the invention in a view from above with a surface-mounted transponder of rectangular geometry, FIG. 3 a section along line III-III from FIG. 2, FIG. 4 a second embodiment of the invention in a view from above with a surface-mounted transponder, which is comparable to that from FIG. 2, FIG. 5 a third embodiment of the invention in a view from above with a surface-mounted transponder, which is comparable with those from FIGS. 2 and 4, FIG. 6 a fourth embodiment of the invention in a view from above with a surface-mounted transponder, which is comparable with those from FIGS. 2, 4 and 5, FIG. 7 a fifth embodiment of the invention in a view from above with a surface-mounted transponder, which is comparable with those from FIGS. 2, 4, 5 and 6, FIG. 8 a sixth embodiment of the invention in a view from above with a surface-mounted transponder, which is comparable with those from FIGS. 2, 4, 5, 6 and 7, FIG. 9 a seventh embodiment of the invention in a view from above with a surface-mounted transponder of round geometry.

FIG. 2 illustrates a magnetic field screen 1, as already disclosed in FIG. 1, where disposed on magnetic field screen 1 is a two-dimensional transponder 2 comprising an antenna structure 8 and a microchip 10 and an antenna bridge 11. Antenna bridge 11 represents an electrical contact between the end pieces of antenna structure 8. The two-dimensional transponder defines a first area section (a). The carrier itself defines a second area section (b). The conductor tracks of antenna structure 8 of transponder 2 are disposed in a rectangular geometry whereby the two-dimensional transverse extension of antenna structure 8 is smaller than its longitudinal extension. In an embodiment according to the invention of magnetic field screen 1 with anisotropic permeability, the direction of increased permeability runs parallel to the longitudinal edges of strips 5 running from top to bottom and parallel to the visible surface. Alternatively, the direction of increased permeability may also run perpendicular to the longitudinal edges of the strips (5), that is to say parallel to the conductor tracks running from left to right of the antenna structure (8). In this case too there is a guarantee that increased permeability exists in the direction of the conductor tracks of important sections of the antenna structure (8). Which sections of the antenna structure (8) are deemed to be important emerges primarily from the geometry of the antenna structure (8). In the present case of a rectangular antenna structure (8), both the conductor tracks running from top to bottom and also the conductor tracks running from left to right are to be counted as the important sections of the antenna structure (8).

Antenna structure 8 is connected in such a way to microchip 10 that after resonant excitation of antenna structure 8, the end pieces of which are connected via antenna bridge 11 so as to electrically conductive, microchip 10 can process an antenna signal. Antenna structure 8 is also formed as a coil which permits an inductive coupling using a magnetic field beamed in from outside. For this antenna structure 8 is arranged with a capacitance into a resonant circuit, whereby microchip 10 is tuned to the resonant circuit's working frequency and is supplied with energy via the excited resonant circuit. The data stored on microchip 10 may, for example, be transmitted and read by a damping modulation of the magnetic field beamed in. Antenna structure 8, antenna bridge 11 and microchip 10 may be connected directly to the magnetic field screen or, however, via an insulating layer which is not explicitly shown in FIG. 2. If a connection without insulating layer is provided, then the screening material of strips 5 must not be electrically conductive so as not to create an electrical short-circuit with conductive antenna structure 8. As an alternative to an insulating layer between strips 5 and antenna structure 8, it would also be possible to use an insulating layer that merely surrounds the antenna structure and thus makes electrical contact towards the outside impossible.

Figure 3:
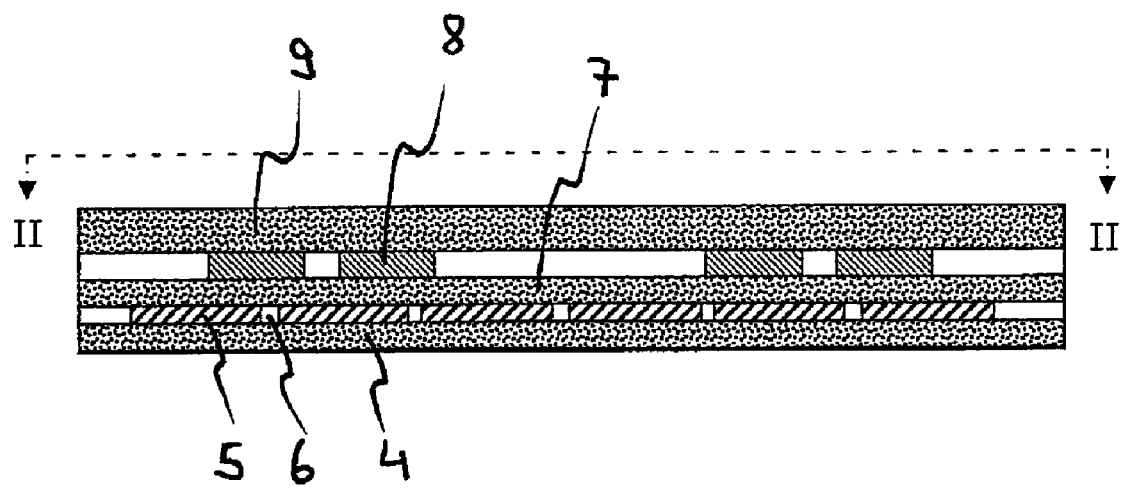

FIG. 3 illustrates a cross-section through the arrangement from FIG. 2 along line III-III with transponder 2 and magnetic field screen 1. Similarly, in FIG. 3 line II-II refers to the corresponding position of the view in FIG. 2. FIG. 3 first of all shows from the bottom up carrier 4 on which are directly applied strips 5 of magnetic field screening material with clear areas 6 between them. Above strips 5 is an insulating layer 7 on which for its part the transponder is applied. FIG. 3 merely shows the cross-sections of the conductor tracks of antenna structure 8. Disposed on the conductor tracks of antenna structure 8 of transponder 2 is a cover material 9 which covers antenna structure 8 towards the top. The connection of the individual layers is not further illustrated but may in the present case be effected directly by way of adhesive bonds.

In the present embodiment, the lateral marginal regions of the entire arrangement are not terminated by means of a filling or bonding material and consequently do not form a completely sealed unit together with the remaining elements. Nevertheless, such filling or termination would be conceivable. Moreover, it would also be conceivable for stabilising elements or shape elements to be inserted in the layer sequence illustrated which might take account of application-specific requirements on the configuration. For example, lateral reinforcements could be integrated in the layer sequence of the configuration in order to stabilise said configuration. Similarly, shape elements that adapt the entire configuration to a specific surface topography could be integrated.

Figure 4:
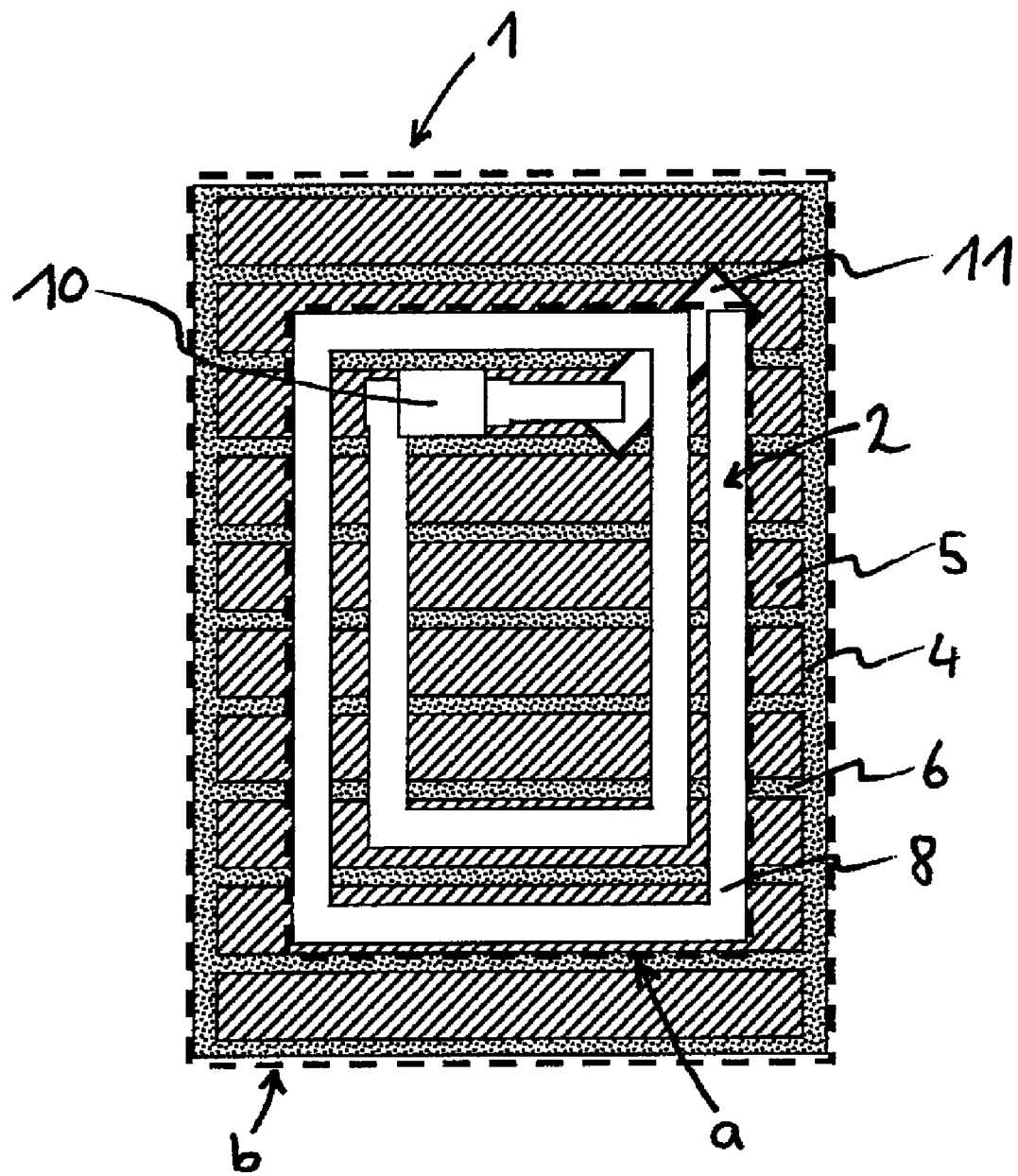

FIG. 4 illustrates a second embodiment of magnetic field screen 1, whereby transponder 2 attached on magnetic field screen 1 corresponds to that from FIG. 2. The two-dimensional transponder again defines a first area section (a). The carrier in turn defines a second area section (b). The essential difference between magnetic field screen 1 shown here and that from FIG. 2 is in the transverse arrangement of strips 5 which are disposed laterally with corresponding clear areas 6 in a manner parallel to one another. A total of 10 strips 5 is provided in the embodiment of magnetic field screen 1 illustrated. It is significant in the present configuration, however, that if anisotropic permeability of the screening material is provided, the increased permeability of the screening material cannot run exclusively along the longitudinal edges of strip 5 and parallel to the visible surface. According to the invention, for example, increased permeability is then provided perpendicular to the longitudinal edges of strips 5 parallel to the visible surfaces.

Figure 5:
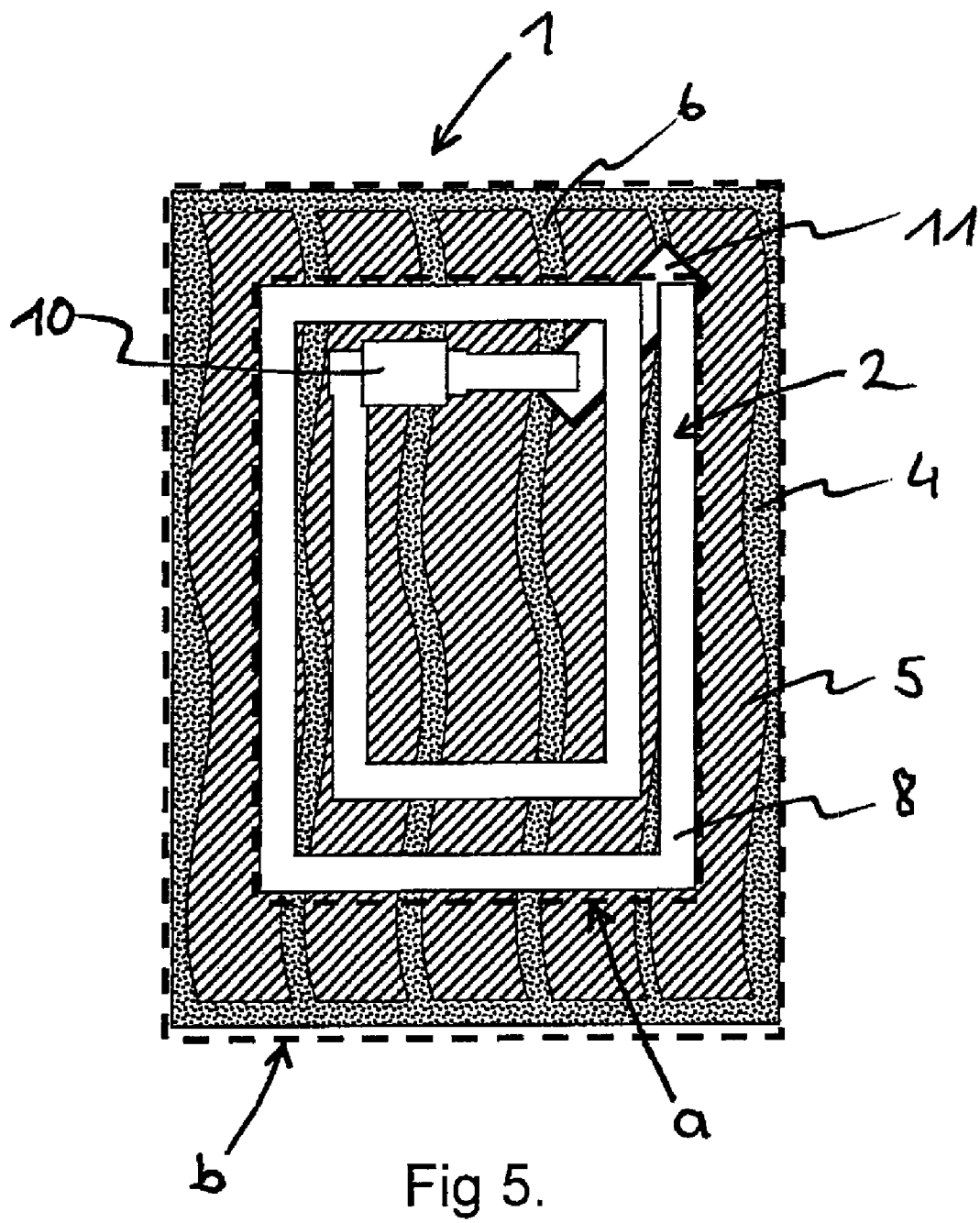

FIG. 5 illustrates a third embodiment of magnetic field screen 1, whereby transponder 2 attached to magnetic field screen 1 again corresponds in its construction to that from FIG. 2. The central difference between magnetic field screen 1 shown here and that from FIG. 2 or FIG. 4 is in the wave-like shape of strips 5 which are disposed longitudinally in a manner parallel to one another on carrier 4 with corresponding clear areas 6. Provided in the embodiment illustrated in FIG. 5 are a total of 5 strips the number of which may, however, be changed at will according to the invention. It is significant in the present configuration that, if anisotropic permeability of the screening material is provided, for the execution according to the invention of magnetic field screen 1, a direction of increased permeability may not exclusively follow the wave structure of strips 5 but will, for example, essentially follow the orientation of the conductor tracks of antenna structure 8, said tracks running from top to bottom.

Figure 6:
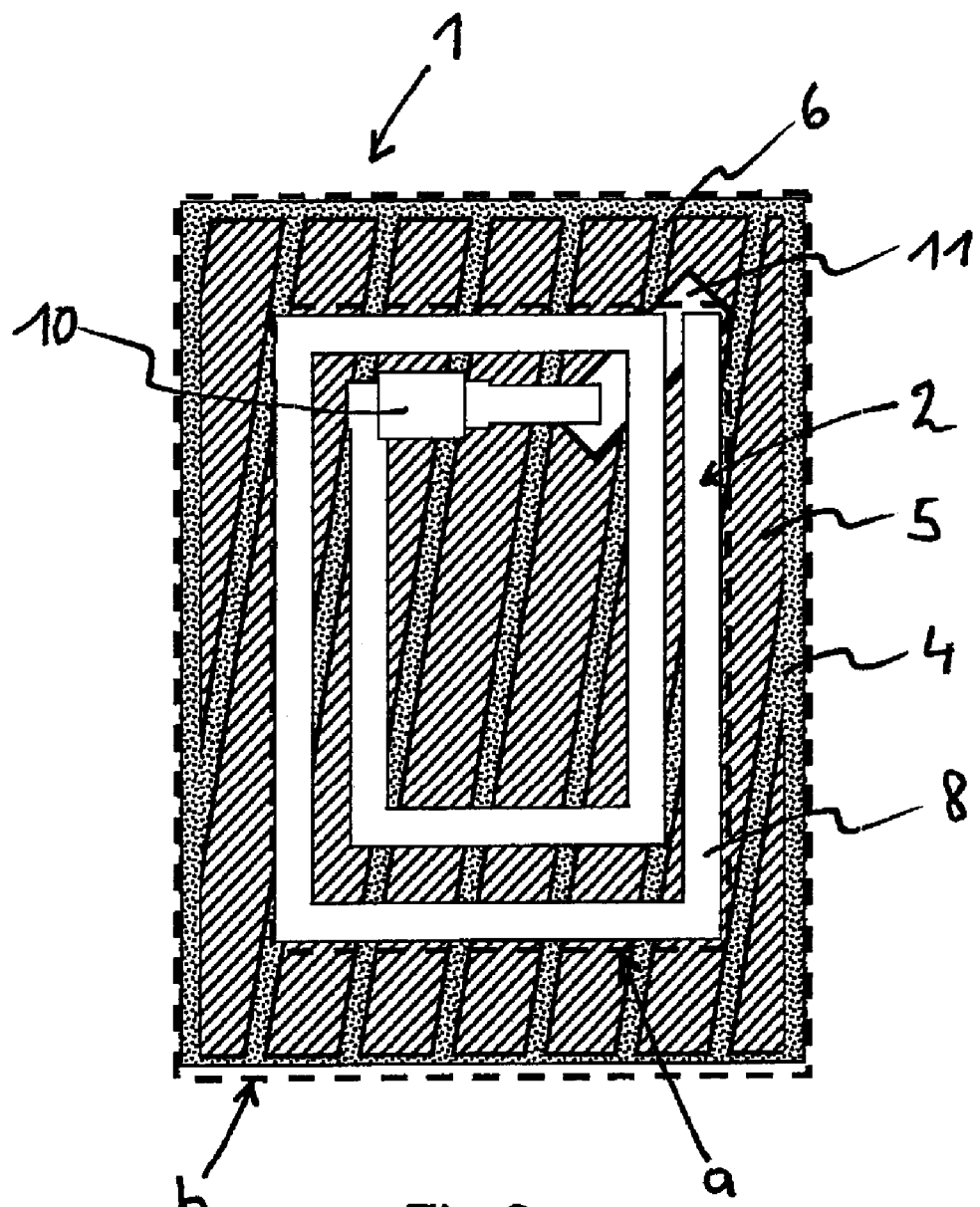

The same idea is also illustrated in FIG. 6 which shows an arrangement of strips 5 that is diagonal to antenna structure 8. Once again transponder 2 shown in FIG. 6 corresponds to transponders 2 shown previously in FIGS. 2, 4 and 5. In the configuration illustrated, for example, increased permeability is also primarily oriented towards the alignment of the conductor tracks of antenna structure 8 of transponder 2, said tracks running from top to bottom, if anisotropic permeability of the screening material is provided.

Figure 7:
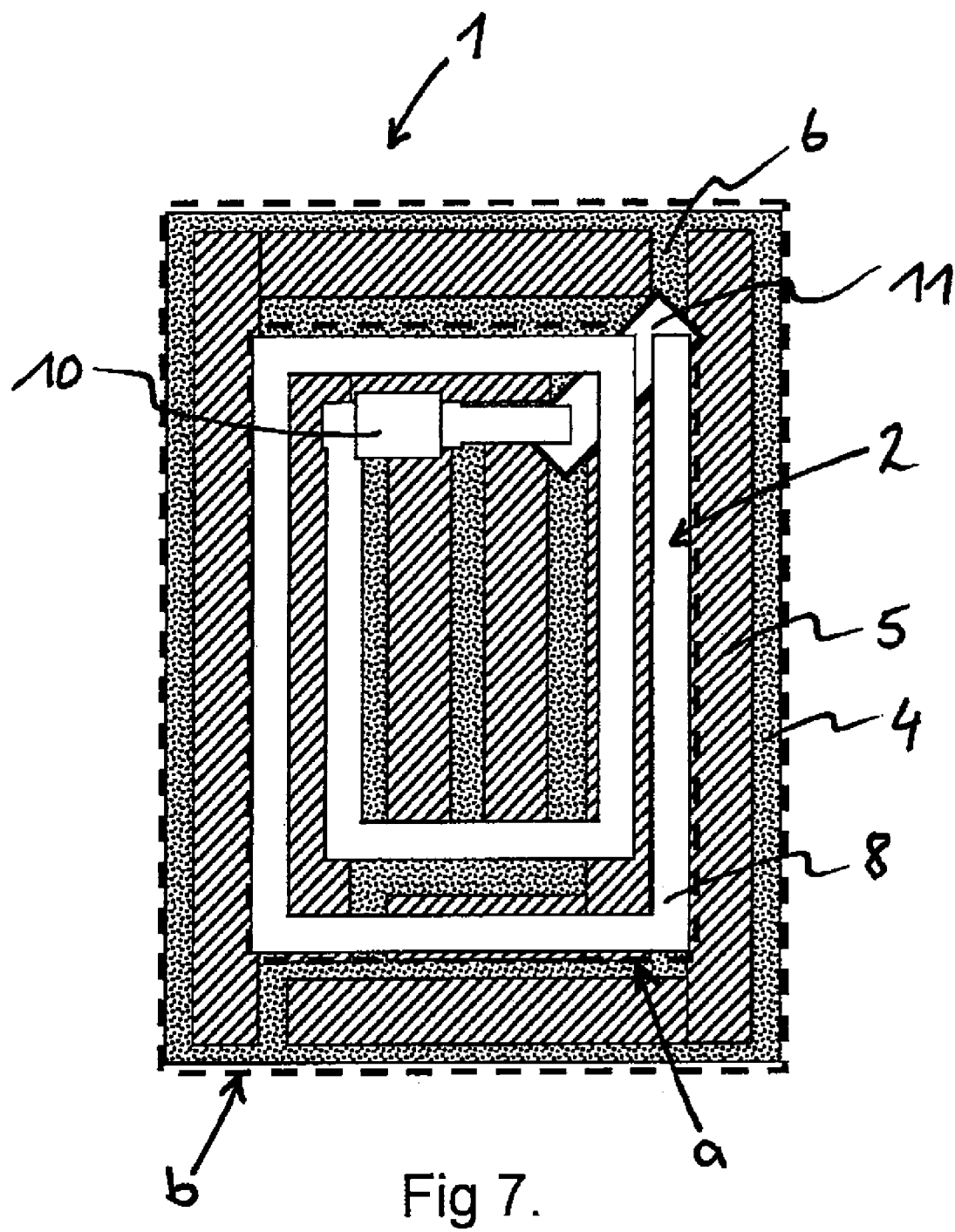

FIG. 7 illustrates a further possible embodiment according to the invention of magnetic field screen 1, which provides an L-shaped strip shape for two outermost strips 5 in relation to the margin of carrier 4. It can be ensured by means of such a configuration that strips 5 are aligned parallel to one another in important sections, whereby the longitudinal edges of strips 5 are provided in the direction of current flow, in particular in the direction of the conductor tracks of important sections of antenna structure 8.

Figure 8:
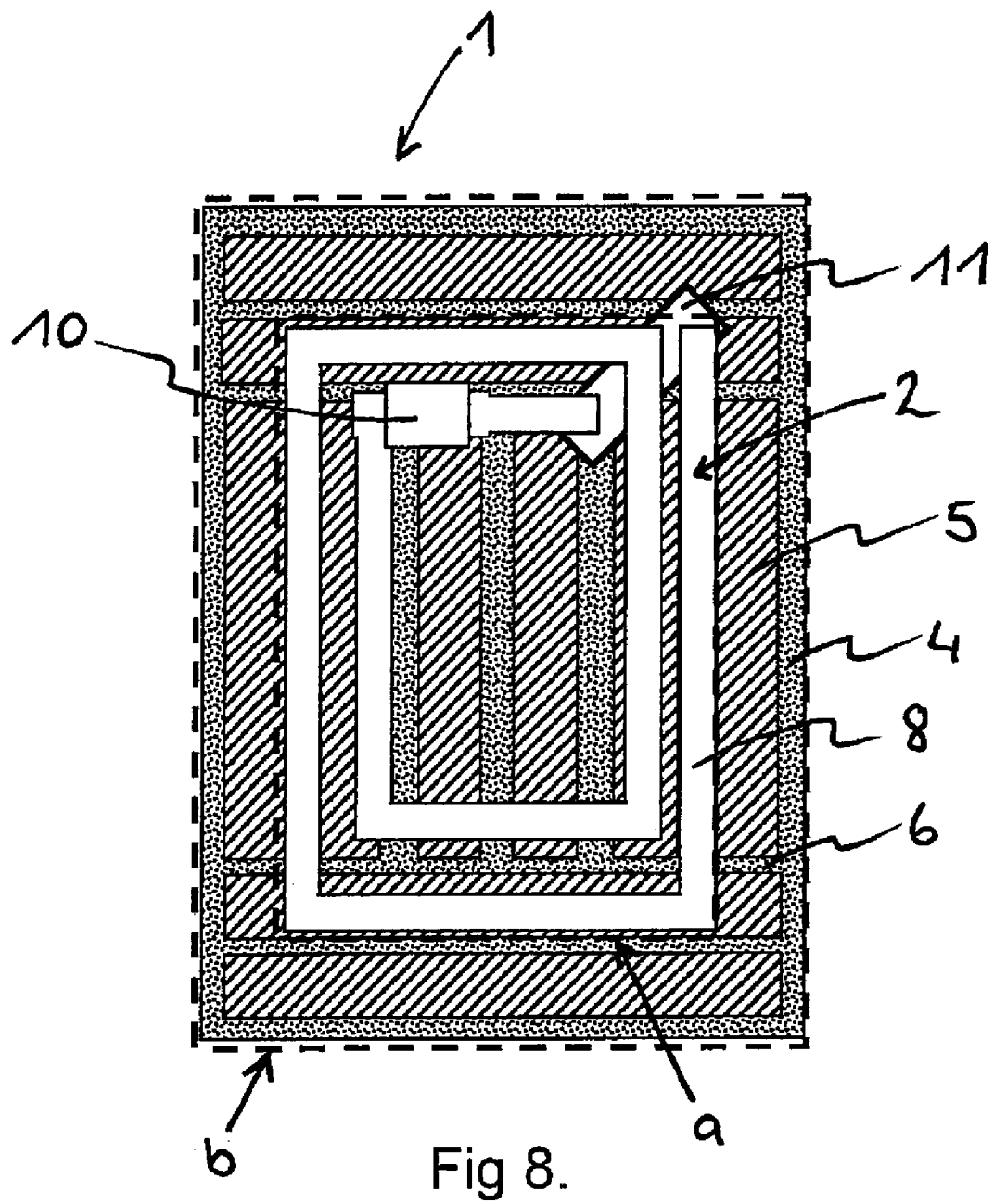

FIG. 8 illustrates a further variation of an embodiment according to the invention of magnetic field screen 1. In this embodiment, strips 5 run in such regions from top to bottom in which the conductor tracks of antenna structure 8 also have such a course. In the remaining regions, strips 5 run from left to right where the conductor tracks of antenna structure 8 also have a course from left to right. Consequently, this configuration also guarantees that strips 5 are aligned parallel to one another in important sections, whereby the longitudinal edges of strips 5 are provided in the direction of current flow, in particular in the direction of the conductor tracks of important sections of antenna structure 8.

Figure 9:
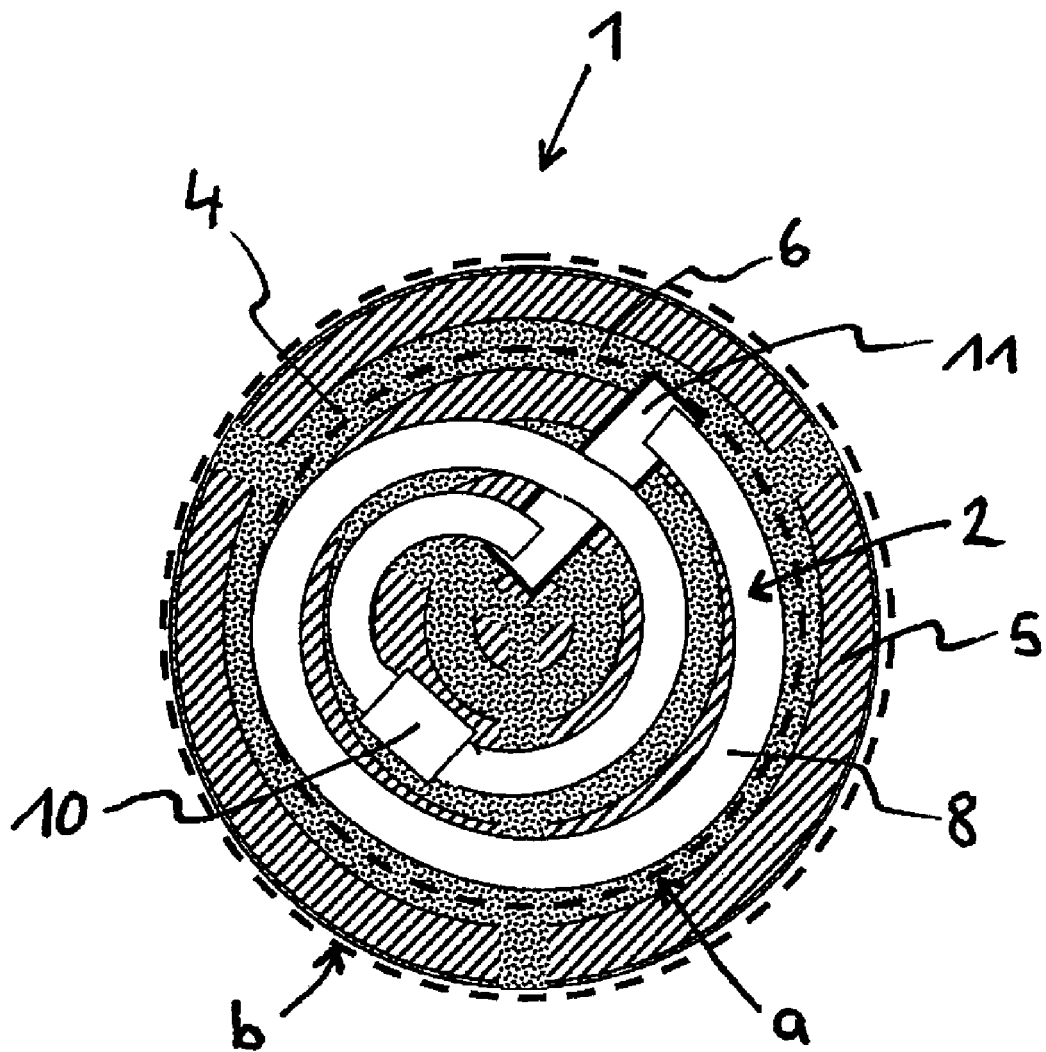

FIG. 9 illustrates an alternative overall geometry of a magnetic field screen 1 according to the invention. Carrier 4 is designed in a circular shape in the configuration shown. Disposed concentrically on carrier 4 are ring segment-shaped strips 5 with constant clear areas 6 between them. Unlike a purely circular configuration, a ring segment-shaped configuration has the advantage of preventing an opposing field from being induced into the rings. In the configuration illustrated, 4 strips 5 are provided whereby a person skilled in the art may change the number thereof at will. Disposed on carrier 4 with strips 5 is an essentially spiral, flat antenna structure 8, which is connected with a microchip 10 to a transponder 2. In this geometry too the two-dimensional transponder again defines a first area section (a). The carrier in turn defines a second area section (b). If anisotropic permeability of the screening material is provided, in an embodiment according to the invention increased permeability of strips 5 essentially follows the conductor tracks of antenna structure 8.

At this point it should be pointed out that all the parts described above, seen on their own and in any combination, in particular the details illustrated in the drawings, are claimed as being essential for the invention. Modifications of this are familiar to the person skilled in the art.

REFERENCE NUMBERS

1 Magnetic field screen
2 RFID transponder
4 Carrier
5 Strips
6 Clear area
7 Insulating layer
8 Antenna structure
9 Cover material
10 Microchip
11 Antenna bridge
a First area section
b Second area section

The invention claimed is:

1. Apparatus for screening the magnetic field (1) of an RFID transponder (2) in relation to a substrate, which comprises, in a first area section (a), at least one flat antenna structure (8) which comprises conductor tracks for conducting current in a direction of current flow and has an application-specific extent, wherein the apparatus comprises a second area section(b) or carrier (4) to which strips (5) of a highly permeable screening material are applied such that they are oriented in a predetermined manner with respect to one another, wherein the second area section (b) is arranged parallel to the first area section (a), characterised in that the highly permeable screening material has anisotropic permeability, wherein increased permeability is provided in the direction of current flow in the direction of the conductor tracks of important sections of the antenna structure (8).

2. Apparatus for screening the magnetic field (1) of an RFID transponder (2), which comprises, in a first area section (a), at least one flat antenna structure (8) which comprises conductor tracks for conducting current in a direction of current flow and has an application-specific extent, wherein the apparatus comprises a second area section (b) or carrier (4) to which strips (5) of a highly permeable screening material are applied such that they are oriented in a predetermined manner with respect to one another, wherein the second area section (b) is arranged parallel to the first area section (a), characterised in that the strips (5) are aligned parallel to one another in important sections and are spaced apart by clear areas (6)

between longitudinal edges of the strips (5), whereby the longitudinal edges of the strips (5) are provided in the direction of current flow in the direction of the conductor tracks of important sections of the antenna structure (8) and the screening material of the strips (5) is electrically conductive.

3. Apparatus according to claim 1,
characterised in that
the strips (5) are aligned substantially parallel to one another and spaced apart by means of clear areas (6) between longitudinal edges of the strips (5).

4. Apparatus according to claim 1,
characterised in that
the screening material has an electrical conductivity that is lower than that of the substrate onto which the magnetic field screen (1) is applied.

5. Apparatus according to claim 1,
characterised in that
the screening material has an electrical conductivity that is lower than the conductivity of the material of the antenna structure (8).

6. Apparatus according to claim 1,
characterised in that
the screening material has a specific resistance of at least $10^{-8}$ Ωm and of at most $10^{-2}$ Ωm.

7. Apparatus according to claim 1,
characterised in that
the screening material comprises iron, nickel, cobalt, gadolinium, compounds of the garnet group of substances, such as yttrium-aluminium compounds, alloys of said substances or samarium in addition to amorphous metals.

8. Apparatus according to claim 1,
characterised in that
the screening material comprises a soft magnetic material with low magnetic reversal losses.

9. Apparatus according to claim 1,
characterised in that
the screening material comprises nanocrystalline structures.

10. Apparatus according to claim 1,
characterised in that
the strips (5) are formed flexibly and have a thickness of less than 500 μm.

11. Apparatus according to claim 1,
characterised in that
the strips (5) are disposed one above the other in a plurality of layers separated by insulating layers.

12. Apparatus according to claim 1,
characterised in that
the carrier (4) consists of a material that is essentially non-conductive.

13. Apparatus according to claim 1,
characterised in that
the carrier (4) is formed as an inlay of an RFID transponder (2).

14. Apparatus according to claim 1,
characterised in that
the carrier (4) with the RFD transponder (2) attached on it is enclosed in plastic, paper or film laminate, whereby at least one insulating layer (7) is provided between carrier (4) and RFID transponder (2).

15. Apparatus according to claim 1,
characterised in that
an area section, which is captured by the strips (5) on the second area section (b), is at least as big as the first area section (a) and overlaps the same.

16. Apparatus according to claim 1,
characterised in that
the RFID transponder (2) works at 13.56 MHz in the HF frequency range.

17. Method for the manufacture of a magnetic field screen (1) of an RFID transponder (2), which comprises, in a first area section (a), at least one flat antenna structure (8) which comprises conductor tracks for conducting current in a direction of current flow and has an application-specific extent, wherein the method comprises the provision of a second area section (b) or carrier (4) to which strips (5) of a highly permeable screening material are applied such that they are oriented in a predetermined manner with respect to one another, wherein the second area section (b) is arranged parallel to the first area section (a),
characterised in that
the highly permeable screening material is manufactured with an anisotropic permeability whereby the screening material is aligned in such a manner relative to the antenna structure (8) that increased permeability arises in the direction of current flow in the direction of the conductor tracks of important sections of the antenna structure (8).

18. Method for the manufacture of a magnetic field screen (1) of an RFID transponder (2), which comprises, in a first area section (a), at least one flat antenna structure (8) which comprises conductor tracks for conducting current in a direction of current flow and has an application-specific extent, wherein the method comprises the provision of a second area section (b) or carrier (4) to which strips (5) of a highly permeable screening material are applied such that they are oriented in a predetermined manner with respect to one another, wherein the second area section (b) is arranged parallel to the first area section (a),
characterised in that
the strips (5) are aligned parallel to one another in important sections and are spaced apart by clear areas (6) between longitudinal edges of the strips (5), whereby the longitudinal edges of the strips (5) are provided in the direction of current flow in the direction of the conductor tracks of important sections of the antenna structure (8) and the screening material of the strips (5) is electrically conductive.

19. Method according to claim 17,
characterised in that
the strips (5) are aligned substantially parallel to one another and spaced apart by means of clear areas (6) between longitudinal edges of the strips (5).

20. Method according to claim 17,
characterised in that
the screening material has an electrical conductivity that is lower than that of the substrate onto which the magnetic field screen (1) is applied.

21. Method according to claim 17,
characterised in that
the strips (5) are manufactured by etching a full-surface screening material.

22. Method according to claim 21,
characterised in that
the full-surface screening material is laminated onto the carrier (4) in a roll-to-roll process.

23. Method according claim 17,
characterised in that
the strips (5) are laminated onto the carrier (4) in a roll-to-roll process.

24. Method according to claim 17,
characterised in that
the strips (5) are manufactured by a cutting mechanical shaping process.
25. Method according to claim 17,
characterised in that
the strips (5) are manufactured by a non-cutting mechanical shaping process.
26. Method according to claim 17,
characterised in that
the strips (5) are manufactured by a wet chemical process.
27. Method according to claim 17,
characterised in that
the strips (5) are manufactured by physical or chemical deposition of the screening material on the carrier (4).
28. Method according to claim 17,
characterised in that
an anisotropy of the permeability of the highly permeable material is induced or reinforced by means of a magnetic field.
29. Method according to claim 17,
characterised in that
fixing of the strips (5) on the substrate (4) is carried out using a bonding agent or a lacquer.
30. Method according to claim 17,
characterised in that
the carrier (4) is bonded to the RFID transponder (2) after the strips (5) have been fixed on the carrier.
31. Method according to claim 17,
characterised in that
the carrier (4) is bonded to the RFID transponder (2) before the strips (5) are fixed on the carrier.
32. Method according to claim 17,
characterised in that
bonding of the RFID transponder (2) and the apparatus for magnetic field screening (1) will be performed by means of folding, laminating or an encapsulation process.
33. Use of an apparatus for screening the magnetic field (1) of an RFID transponder (2) according to claim 1,
for reducing functional losses of the RFID transponder (2) caused by eddy current losses.
34. Apparatus according to one of claim 2,
characterised in that
the screening material has an electrical conductivity that is lower than that of the substrate onto which the magnetic field screen (1) is applied.
35. Apparatus according to one of claim 2,
characterised in that
the screening material has an electrical conductivity that is lower than the conductivity of the material of the antenna structure (8).
36. Apparatus according to one of claim 2,
characterised in that
the screening material has a specific resistance of at least $10^{-8}$ Ωm and of at most $10^{-2}$ Ωm.
37. Apparatus according to one of claim 2,
characterised in that
the screening material comprises iron, nickel, cobalt, gadolinium, compounds of the garnet group of substances, such as yttrium-aluminium compounds, alloys of said substances or samarium in addition to amorphous metals.
38. Apparatus according to one of claim 2,
characterised in that
the screening material comprises a soft magnetic material with low magnetic reversal losses.
39. Apparatus according to one of claim 2,
characterised in that
the screening material comprises nanocrystalline structures.
40. Apparatus according to one of claim 2,
characterised in that the strips (5) are formed flexibly and have a thickness of less than 500 μm.
41. Apparatus according to one of claim 2,
characterised in that
the strips (5) are disposed one above the other in a plurality of layers separated by insulating layers.
42. Apparatus according to one of claim 2,
characterised in that
the carrier (4) consists of a material that is essentially non-conductive.
43. Apparatus according to one of claim 2,
characterised in that
the carrier (4) is formed as an inlay of an RFID transponder (2).
44. Apparatus according to one of claim 2,
characterised in that
the carrier (4) with the RFID transponder (2) attached on it is enclosed in plastic, paper or film laminate, whereby at least one insulating layer (7) is provided between carrier (4) and RFID transponder (2).
45. Apparatus according to one of claim 2,
characterised in that
an area section, which is captured by the strips (5) on the second area section (b), is at least as big as the first area section (a) and overlaps the same.
46. Apparatus according to one of claim 2,
characterised in that
the RFID transponder (2) works at 13.56 MHz in the HF frequency range.
47. Method according to one of claim 18,
characterised in that
the screening material has an electrical conductivity that is lower than that of the substrate onto which the magnetic field screen (1) is applied.
48. Method according to one of claim 18,
characterised in that
the strips (5) are manufactured by etching a full-surface screening material.
49. Method according to one of claim 18,
characterised in that
the strips (5) are laminated onto the carrier (4) in a roll-to-roll process.
50. Method according to one of claim 18,
characterised in that
the strips (5) are manufactured by a cutting mechanical shaping process.
51. Method according to one of claim 18,
characterised in that
the strips (5) are manufactured by a non-cutting mechanical shaping process.
52. Method according to one of claim 18,
characterised in that
the strips (5) are manufactured by a wet chemical process.
53. Method according to one of claim 18,
characterised in that
the strips (5) are manufactured by physical or chemical deposition of the screening material on the carrier (4).
54. Method according to one of claim 18,
characterised in that
an anisotropy of the permeability of the highly permeable material is induced or reinforced by means of a magnetic field.

55. Method according to one of claim 18, characterised in that
fixing of the strips (5) on the substrate (4) is carried out using a bonding agent or a lacquer.

56. Method according to one of claim 18, characterised in that
the carrier (4) is bonded to the RFID transponder (2) after the strips (5) have been fixed on the carrier.

57. Method according to one of claim 18, characterised in that
the carrier (4) is bonded to the RFID transponder (2) before the strips (5) are fixed on the carrier.

58. Method according to one of claim 18, characterised in that
bonding of the RFID transponder (2) and the apparatus for magnetic field screening (1) will be performed by means of folding, laminating or an encapsulation process.

59. Use of an apparatus for screening the magnetic field (1) of an RFID transponder (2) according to claim 2,
for reducing functional losses of the RFID transponder (2) caused by eddy current losses.

\* \* \* \* \*